Patented Dec. 29, 1942

2,306,478

UNITED STATES PATENT OFFICE 2,306,478

MOISTUREPROOF SHEET WRAPPING MATERIAL

Harold Stephens Holt, Wilmington, Del., assignor to E. I. du Pont de Nemours & Company, Wilmington, Del., a corporation of Delaware No Drawing. Application November 1, 1939, Serial No. 302,323

12 Claims. (Cl. 117—146)

This invention relates to moistureproof sheet wrapping material, especially transparent, flexible, non-tacky, moistureproofed, non-fibrous cellulosic web. More particularly, it appertains to moistureproof coatings for regenerated cellulose and like film which are not readily scraped from the base sheet by automatic machinery, and which adhere to the base sheet with great tenacity in the vicinity of adhesive bonds.

Recently there has appeared in commerce a transparent, moistureproof sheet wrapping material consisting of a base sheet of regenerated cellulose film coated with a moistureproofing coating composition. The manufacture of such a base sheet is described in U. S. A. Patent No. 1,548,864 (Brandenberger), and the coating of the like with a moistureproofing coating composition is described in U. S. A. Patent No. 1,737,187 (Charch & Prindle). The moistureproofing coating comprises essentially a film former (usually nitrocellulose) and a moistureproofing agent (usually paraffin wax). Ordinarily the coating also contains a blending agent (usually a resin) for the film former and moistureproofing agent. Frequently a plasticizer for the moistureproofing coating is also present. In spite of the many desirable properties of this wrapping material, it has certain characteristics which limit its usefulness, particularly under conditions of high humidity or actual contact with water. For example, when products containing considerable water (cheese, fish, fresh vegetables, etc.) are wrapped therein the surface coating loosens in a few hours, with the result that the effectiveness of the wrapping is very much reduced. Extensive research has been carried out with the object in view of improving this type of material.

One line of endeavor has been the search for new film formers. Among the materials suitable for this purpose previously discovered have been rubber and chlorinated rubber. The moistureproofing coating compositions utilizing these materials as film formers give a very desirable product for a wrapping tissue so far as moistureproofness, transparency and flexibility are concerned, but it has been found that such moistureproofing coating compositions do not adhere to the smooth, glossy surface of the base sheet (for example, regenerated cellulose) with sufficient tenacity for all purposes. Occasionally such coatings are found to slough off or be scraped from the surface in certain operations on automatic wrapping machines. As a result, there is usually a fouling of the apparatus and a loss in moistureproofness of the wrapping. Furthermore, an undesirable appearance may result from the scraping off of the moistureproof coating. Where the wrappings are sealed by means of adhesives or the application of heat and pressure to the coating itself, it frequently happens that the adhesive bond formed is not sufficiently strong because the coating in the area of the adhesive bond separates from the base sheet.

If beta-naphthol is worked on a rubber mill (or in a Banbury mixer) with rubber and a small amount of di-hydroxy-fluoro-boric acid or sulfuric acid for about 15 minutes at about 100° C., there is obtained a material quite unlike rubber and the heretofore known rubber derivatives and isomers. The material sinks when placed in water, will not adhere to rubber, is more soluble in hydrocarbon solvents than rubber isomers, and when mixed with rubber on a mill and the mixture made into a thin cement, layers off.

It has now been discovered that this material which, for convenience, may be generically described as a phenol-modified rubber, is an excellent film former and that moistureproofing coating compositions employing it in that capacity adhere very satisfactorily to non-fibrous water sensitive cellulosic film. It is an excellent adhesive and adhesive base for regenerated cellulose film.

This invention had for an object the manufacture of improved transparent, moistureproof sheet wrapping materials. Further objects were to provide firmly adhering transparent, moistureproof, flexible, non-tacky coating compositions for non-fibrous cellulosic sheet material; to provide moistureproofing coating compositions having a film former comprising essentially a phenol-modified rubber; to provide a moistureproofing coating composition comprising essentially a phenol-modified rubber and a moistureproofing agent; and to provide a moistureproofing coating composition comprising essentially a phenol-modified rubber and a moistureproofing wax. A general advance in the art, and other objects which will appear hereinafter, are also contemplated.

In general the objects of this invention are obtained by coating a non-fibrous, non-porous, cellulosic film with a moistureproofing coating composition comprising phenol-modified rubber as a film former, a moistureproofing wax and, optionally, other constituents such as plasticizers, blending agents, resin, etc.

From the following description and specific examples, in which are disclosed certain embodiments of the invention, as well as details of what is believed to be the best mode for carrying out the invention, it will be apparent how the foregoing objects and related ends are accomplished. Parts are given by weight throughout the application.

*Example I*

A moistureproofing coating composition mixture consisting of:

| | Per cent |
|---|---|
| Beta-naphthol modified rubber | 88 |
| Paraffin wax (M. P. 61° C.) | 12 | was prepared and dissolved in toluene (B. P. 111° C.). The resulting solution was sprayed on a sheet of regenerated cellulose. The excess of the coating composition was removed by passing the covered sheet under a doctor knife. The coated film was then introduced into a drier through which air was circulating, where, after a rapid rise in temperature, the coating was dried at a temperature approximately equal to the melting point of the wax.

*Example II*

A moistureproofing coating composition mixture consisting of:

| | Per cent |
|---|---|
| Beta-naphthol modified rubber | 80 |
| Paraffin wax (M. P. 61° C.) | 10 |
| Chlorinated diphenyl (sp. g. 1.646–1.653, chlorine 62%) | 10 | was prepared and dissolved in a suitable solvent. A web of regenerated cellulose was passed through a bath of the resulting solution and then through doctor rolls to remove the excess solution. The coating was then dried on the web at a temperature slightly above the melting point or crystallization point of the wax material by passage through a heated chamber through which air was circulating.

*Example III*

A moistureproofing coating composition mixture consisting of:

| | Per cent |
|---|---|
| Beta-naphthol modified rubber | 82 |
| Paraffin wax (M. P. 61° C.) | 8 |
| Hydrogenated methyl abietate (Hercolyn grade, prepared according to U. S. A. Patent 1,944,241) | 10 | was prepared and dissolved in a suitable solvent. The composition was applied to a regenerated cellulose film by spraying. After passage through doctor rolls to remove excess solution, the covered film was passed through a drying chamber equipped for air circulation and solvent recovery. The temperature of the covered film was rapidly raised to the melting point of the wax and was held until the solvent had been removed from the coating on the sheet.

*Example IV*

A moistureproofing coating composition mixture consisting of:

| | Per cent |
|---|---|
| Beta-naphthol modified rubber | 69 |
| Paraffin wax (M. P. 61° C.) | 6 |
| Dicyclohexyl phthalate | 7.5 |
| Dibutyl phthalate | 7.5 |
| Hydrogenated methyl abietate (U. S. A. Patent 1,944,241) | 10 | was prepared and dissolved in a suitable solvent. A continuous sheet of regenerated cellulose was passed through a dip bath of the solution, then between doctor knives and into a drying chamber. In the drier the solvent was evaporated at a temperature at least approximately equal to the melting point of the wax in the composition. This material had a heat seal bond strength value of 800.

*Example V*

A moistureproofing coating composition mixture consisting of:

| | Per cent |
|---|---|
| Beta-naphthol modified rubber | 59 |
| Paraffin wax (M. P. 61° C.) | 6 |
| Dicyclohexyl phthalate | 12.5 |
| Dibutyl phthalate | 12.5 |
| Rosin 2,017,866* | 10 |

*This is a "modified rosin" prepared by treating rosin in accordance with U. S. A. Patent No. 2,017,866. In general its properties are much the same as those of rosin, but with the difference that it has a molecular weight within the range 5% to 400% greater than ordinary rosin in its pure state and higher than that of pure abietic acid. That it has a melting point (as determined by the capillary tube method) of about 80° C., and higher than the melting point of pure abietic acid and of purified rosin when in the resin state. That it is substantially free from combined sulfur and hardening substances held in combination, and that it has an iodine value lower than that of pure abietic acid.

was prepared and dissolved in a suitable solvent. A continuous sheet of regenerated cellulose was passed through a dip bath of the solution, then between doctor knives and into a drying chamber. In the drier the solvent was evaporated at a temperature at least approximately equal to the melting point of the wax in the composition. This material had a heat seal bond strength value of 600.

*Example VI*

A moistureproofing coating composition mixture consisting of:

| | Per cent |
|---|---|
| Beta-naphthol modified rubber | 59 |
| Paraffin wax (M. P. 61° C.) | 6 |
| Dibutyl phthalate | 12.5 |
| Dicyclohexyl phathalate | 12.5 |
| Para cumarone indene resin (M. P. in the range 10°–45° C.) | 10 | was prepared and dissolved in a suitable solvent. A regenerated cellulose sheet was covered with the resulting solution by spraying, and the coated sheet passed through doctor knives to remove the excess solution. The coated base sheet was then dried at a lower temperature than the melting point or crystallization point of the wax in the composition and then subjected to a heat treatment at a temperature at least equal to the melting point or crystallization point of the wax in the composition.

*Example VII*

A moistureproofing coating composition mixture consisting of:

| | Per cent |
|---|---|
| Beta-naphthol modified rubber | 40 |
| Paraffin wax (M. P. 61° C.) | 10 |
| Rosin 2,017,866 | 10 |
| Pliolite* | 40 |

*Pliolite is a thermoplastic rubber derivative made by condensing rubber with a catalyst such as tin tetrachloride (see Paper Trade Journal, page 96, February 23, 1939, J. I. E. C. XXVI, 125, and U. S. A. Patents No. 1,797,188, 1,846,247, 1,853,334 and 2,052,391). The chemical structure is described in "Rubber Age," April 1939, and J. I. E. C. XIX, 1033.

was prepared and dissolved in a suitable solvent. A regenerated cellulose film was moistureproofed by coating it with the resultant solution in the usual manner.

Example VIII

A moistureproofing coating composition mixture consisting of:

| | Per cent |
|---|---|
| Beta-naphthol modified rubber | 29.5 |
| Paraffin wax (M. P. 61° C.) | 6 |
| Dibutyl phthalate | 12.5 |
| Dicyclohexyl phthalate | 12.5 |
| Rosin 2,017,866 | 10 |
| Chlorinated rubber (65%–68% chlorine) | 29.5 | was prepared and dissolved in a suitable solvent. A regenerated cellulose film was moistureproofed by coating it with the resultant solution in the usual manner. The moistureproof sheet had a heat seal bond strength of 100. In a similar product, in which only chlorinated rubber (59%) was used as the film former, the heat seal strength was zero.

Example IX

A moistureproofing coating composition mixture consisting of:

| | Per cent |
|---|---|
| Beta-naphthol modified rubber | 93 |
| Paraffin wax (M. P. 61° C.) | 7 | was prepared and dissolved in a suitable solvent. A regenerated cellulose film was moistureproofed with the resultant solution by the usual methods of application.

Example X

A moistureproofing coating composition mixture consisting of:

| | Per cent |
|---|---|
| Beta-naphthol modified rubber | 90 |
| Paraffin wax (M. P. 61° C.) | 10 | was prepared and dissolved in a suitable solvent. A regenerated cellulose film was moistureproofed with the resultant solution by the usual methods of application.

Example XI

A moistureproofing coating composition mixture consisting of:

| | Percent |
|---|---|
| Beta-naphthol modified rubber | 70 |
| Paraffin wax (M. P. 61° C.) | 6 |
| Dibutyl phthalate | 7 |
| Dicyclohexyl phthalate | 7 |
| Hydrogenated methyl abietate (U. S. A. Patent 1,944,241) | 10 | was prepared and dissolved in a suitable solvent. A regenerated cellulose film was moistureproofed with the resultant solution by the usual methods of application.

Example XII

A moistureproofing coating composition mixture consisting of:

| | Percent |
|---|---|
| Phenol modified rubber | 70 |
| Paraffin wax (M. P. 61° C.) | 6 |
| Dibutyl phthalate | 7 |
| Dicyclohexyl phthalate | 7 |
| Hydrogenated methyl abietate (U. S. A. Patent 1,944,241) | 10 | was prepared and dissolved in a suitable solvent. A regenerated cellulose film was moistureproofed with the resultant solution by the usual methods of the application.

Example XIII

A moistureproofing coating composition mixture consisting of:

| | Percent |
|---|---|
| Beta-naphthol modified rubber | 6.48 |
| Urea formaldehyde monohydric alcohol (iso-butanol) resin (solids-basis) | 3.24 |
| Maleic acid | 0.36 |
| Paraffin wax (M. P. 60° C.) | 0.72 |
| Dewaxed damar | 1.20 |
| Toluene | 74.80 |
| Isobutanol | 13.20 | was prepared. A regenerated cellulose sheet was coated with this moistureproofing coating in the usual manner.

The primary film-forming ingredients in the foregoing examples are, for convenience, called (generically) phenol-modified rubbers or phenol-modified rubber 2,158,530. They are prepared according to U. S. A. Patent No. 2,158,530 (Williams).

The beta-naphthol modified rubber of Examples I, II, III, IV, V, VI, VII and VIII was prepared from beta-naphthol (20 parts) and rubber (100 parts) with sulfuric acid (4 parts) as a catalyst. The phenol ($C_6H_5OH$)-modified rubber product used in Example IX was prepared from beta-naphthol (5 parts) and rubber (100 parts) with sulfuric acid (4 parts) as the catalyst. The beta-naphthol derivative of Example X was prepared from beta-naphthol (10 parts) and rubber (100 parts) with sulfuric acid (4 parts) as a catalyst. The film former of Example XI was prepared from beta-naphthol (40 parts) and rubber (100 parts) with sulfuric acid (4 parts) as a catalyst. The phenol derivative of Example XII was prepared from phenol (40 parts), rubber (100 parts) with di-hydroxy-fluor-boric acid (4 parts) as a catalyst.

In the manufacture of the phenol-modified rubber, it is customary to mill the rubber with more of the phenol body than is required by the theoretical proportions for the reaction. This excess beta-naphthol, phenol or the like can be removed from the reaction mass at the end of the reaction by treatment with a suitable solvent therefor. It was such a purified product that was used in the specific examples set out above. The crude product containing the excess phenolic material can be used as produced in many instances. In other cases the excess phenolic body can be converted to a phenol-formaldehyde type resin (for example, by treating the rubber-phenol reaction mass) with formaldehyde. The formation of this resin renders the phenolic material inert and more compatible with the coating composition ingredients so that the characteristic tendency of phenol to blush out is obviated.

The product prepared by reacting 5 to 20 parts of beta-naphthol with 100 parts of rubber in the presence of 4 parts of sulfuric acid as a catalyst, and purifying by removing the excess beta-naphthol is preferred for the purposes of this invention. As pointed out in the patent covering the manufacture of these substances, the proportion of beta-naphthol may vary widely (5%–50%, based on the rubber); and various other phenols, such as ordinary phenol, chlorophenol, cresols and di-hydroxy-di-phenyl, and various other catalysts such as organic sulfonic acids, boron-tri-fluoride and hydroxy-fluor-boric acid may be utilized.

Minor proportions of other film forming ingredients may replace part of the phenol-modified rubber when special effects are desired. In addition to the chlorinated rubber and rubber isomer (Pliolite) of the specific examples, mention may be made of rubber, rubber derivatives and synthetic rubbers including caoutchouc, gutta percha, and rubbery polymers of isoprene, butadiene, and their homologs. Film forming resins, both natural and synthetic, and various plastic substances, may be employed. The more common film formers, such as nitrocellulose and cellulose acetate, give desirable products. In general, use may be made of cellulose substitution derivatives, such as cellulose ethers, cellulose esters, cellulose mixed esters and cellulose ether esters.

As a moistureproofing ingredient, any wax (used generically to include wax-like substances) capable of moistureproofing, may be employed. Ordinarily the paraffins, preferably the high melting paraffins (such as those melting above 50° C., or better, 55° C., or still better, approximately 60° C. or over), are preferred. Other suitable materials deserving of special mention are ceresin, montan, palm wax, Japan wax, Chinese insect wax, spermaceti, tallow, beeswax, stearyl stearate and synthetic waxes. The waxy substances may be used singly or in combination.

In its simplest form the moistureproofing composition of the present invention contemplates a solution of the new film forming material and the wax moistureproofing agent in the common solvent. The moistureproofing coatings resulting from such compositions are usually more or less subject to marking when handled, particularly where the moistureproofing agent is a soft wax such as paraffin, or the softer varieties of ceresin wax. This is not objectionable for all, though it is for a large number of uses. This undesirable property may be overcome by introducing a substance which increases the hardness of the coating. Generally waxes or resins are used in the moistureproofing coating composition for this purpose. Among the waxes suitable for increasing the hardness of the coating, hard wax such as carnauba wax, candelilla wax, and the like, are most generally used. The resins employed for this purpose are preferably those soluble in hydrocarbons (such as benzene, toluene, xylene, gasoline, and the like), but it will be understood that resins soluble in other liquids dissolving in the rubber, or waxes already decided upon for the moistureproofing composition, may be employed. Hard or soft resins, for example, rosin, hydrogenated rosin and their derivatives, zinc resinate, alkyd resins, coumarone resins, and the like, are suitable.

In some instances the presence of a hard or soft gum, either natural or synthetic, including gum damar and gum mastic, may be desirable. Compositions utilizing gums and/or resins in general deposit coatings which possess superior surface gloss and smoothness characteristics. One or more of the hardening agents may be used.

Rosin and various forms of modified and purified rosins are often used for the purpose of blending the wax and film forming ingredients. These particular materials therefore have a double function since they also harden the surface. Resins serving only to blend the other ingredients may be used if desired.

Various softening or plasticizing agents, for example, dibutyl phthalate, tricresyl phosphate, chlorinated paraffin, hydrocarbon oils, and the like, may be used. These materials are particularly useful when it is desired to increase the heat sealing properties. In order to secure particular results, one or more of these agents may be present in the moistureproofing coating.

As the solvent, any organic liquid in which both the wax and phenol-modified rubber film former are soluble, may be employed. Illustrative materials are benzene, toluene, xylene, tetrachlorethane, and the like. It is advantageous to choose a solvent with reference to the wax used, particularly in regard to the boiling point of said solvent, which should preferably be higher than the melting point of the wax. For example, when a wax having a melting point of 60° C. is used, a solvent such as toluene (having a boiling point of 111° C.) gives good results. Frequently, when the temperature of the coating is to be maintained at or above the melting point of the wax in the composition while the solvent is being evaporated, it is preferable to use a mixed solvent in which at least one of the components has a boiling point higher than the melting point of the wax. As will be obvious, the term "solvent" as employed herein is intended to cover one or more chemical compounds with or without diluents. In all cases the solvent selected should be of such a nature that it will not injure the base being coated.

The compositions may be modified in many ways to secure other kinds of effects. Pigments or pigment-like materials and metallic soaps may be included in the coating composition. Oil soluble dyes may be added where a colored transparent coating is desired. Variegated effects can be secured by the use of powdered mica, fish scales, metallic salts, etc. Rubber anti-oxidants, accelerative and vulcanizing agents may be incorporated in the composition.

The relative proportions of the solid ingredients constituting the solution or coating may vary within wide limits, depending upon the specific material used and/or the properties desired in the final product. Depending upon the wax used and the properties of coating desired (surface properties, flexibility, transparency, and the like), the amount of wax may range from a relatively small amount (for example, 1% to 2%) to a relatively high proportion (such as 80% or even 95%), based on the total solids. When gums or resins are employed there is also a wide range of compositions which will give satisfactory results. In any formulation it is possible to use larger amounts of a soft gum than of a hard gum without introducing brittleness. The effect of a hard resin may be somewhat counteracted by the presence of rubber or allied substances which acts as a softening agent.

In the preferred embodiment of the invention regenerated cellulose web is the base which is coated. Paper and other cellulosic materials, especially those which are non-fibrous, non-porous and (preferably) transparent, such as treated paper, films of cellulose derivatives (for example, low substituted cellulose ethers), materials coated with non-moistureproofing compositions, sheets of albuminous materials (for example, gelatin, agar-agar, etc.), are also contemplated.

To prevent oxidation and to insure stability of the coating, the presence therein of anti-oxidants may some times be desirable. Such compounds as benzyl-para-amino-phenol, 2-amino-5-hydroxy-toluene, and the like, are preferred for this purpose. They are especially compatible with the ingredients of the various compositions of this invention, and may be incorporated satisfactorily therein, particularly the specific compositions of the examples. The amount of anti-oxidant varies with the different compositions and the result desired. Usually an amount in the range of .1% to 5% (usually 1%) based on the amount of the phenol-modified rubber, is sufficient.

Ordinarily in carrying out the present invention the selected base film is coated with the composition such as a solution comprising phenol-modified rubber and a moistureproofing wax. Optionally, a resin or blending agent and a plasticizer may be incorporated. After the removal of the excess composition (resulting from the mode of application) the uniformly coated sheet is subjected to a temperature equal to the melting point or crystallization point of the wax in the composition, either simultaneously with (and preferably), or alternately subsequent to the drying of (removal of solvent from) the coating.

When the base material is of the type which loses more or less of its moisture, or is dehydrated during some stage or stages in the aforementioned procedure and consequently becomes more or less brittle, the invention further contemplates submitting the dried coated material to a humidifying treatment. This is preferably carried out at an elevated temperature sufficiently high so that the coating will lose a portion of its impermeability, thereby allowing moisture to diffuse through it into the inner base, which is thus softened.

The application of the coating may be accomplished in any suitable manner, such as by passing the base through a bath containing the same, by spraying the coating composition thereon, or the like. After the application of the composition the excess thereof may be removed in any convenient manner, as for example, by doctor knives or doctor rolls. Various coating preparation and application procedures are already known in this art. For examples see U. S. A. Patents No. 1,737,187, 1,826,696 and 1,826,699.

After the base film is coated it is introduced into an appropriate drier such as a chamber through which air is circulated. The coated film is dried in such an apparatus by the evaporation of the solvent, after a rapid rise in temperature, at a temperature at least approximately equal to the melting point or crystallization point of the waxes in the composition. Alternately the coated base film may be first dried at some lower temperature and then subjected to a heat treatment at a temperature equal to, or greater than, the melting point or crystallization point of the wax in the composition.

Moistureproofness, moistureproofing and moistureproof materials and expressions are defined in U. S. A. Patent No. 2,147,180 (Ubben). In the interest of brevity the definitions are not repeated here. The terms and expressions related thereto and employed herein are used in accordance with such definitions.

Heat seal bond and heat seal bond strength are defined and a standard test for their determination is given in U. S. A. Patent No. 2,147,180 (Ubben). In the interest of brevity the definitions and test description are not repeated here. The terms and expressions related thereto and employed herein are used in accordance with such definitions and description.

The coating compositions of this invention are characterized by unusual adhesion to regenerated cellulose surfaces. As indicated previously, it is highly desirable to obtain a moistureproofing coating which adheres with a great degree of tenacity to the base sheet. The success of the moistureproofing coating compositions of this invention in this respect is apparent not only under ordinary atmospheric conditions, but also under conditions of high humidity and when in actual contact with liquid water. Moistureproofing coating compositions heretofore available have not satisfactorily solved the problem of adherence under conditions of high humidity. The present moistureproofing coating compositions adhere tenaciously to regenerated cellulose surfaces over long periods of time in the presence of water (high relative humidity). The unusual adhesion exhibited by the present moistureproofing coating compositions is further reflected in the strong heat seal bonds obtained with some of them. In general, the presence of the phenol-modified rubber improves the strength of the heat seal bond.

When the compositions of this invention are applied in thin layers to the aforementioned bases, there results a product which, as previously indicated, is highly moistureproof and flexible. When the coating is a few thousandths of an inch in thickness (more or less) it still gives the desired moistureproof effects and is transparent. Usually rather thick coatings will not yield perfect optical transparency, but it is unnecessary to apply such quantities to the base to secure moistureproofness. A desirable slip surface is obtained when a hardening agent (to prevent smearing of the coating during the handling) is present. By virtue of the fact that the solid ingredients and the solvent in the present moistureproofing coating compositions are cheaper than those of the same general classes previously employed, the present invention enables a more economical product than that generally used heretofore to be produced.

The extensive and widespread use of moistureproof sheet wrapping materials makes it unnecessary to recite the well known advantages obtained by wrapping commodities, susceptible to gain or loss of moisture, therein. It is sufficient to say that the sheet wrapping materials of this invention make it possible to maintain the original fresh state of perishable commodities over long periods of time.

As many apparently widely different embodiments of this invention may be made without departing from the spirit and scope thereof, it is to be understood that this invention is not limited to the specific embodiments thereof except as defined in the appended claims.

I claim:

1. An article of manufacture comprising a base formed of a sheet of non-moistureproof non-fibrous and transparent material coated with a composition comprising a film-forming substance and a moistureproofing wax in proportions and of a thickness to produce a transparent moistureproof product, said film-forming substance being phenol-modified rubber, said phenol modified rubber being a reaction product of rubber and a phenol containing 1% to 5% of the phenol chemically combined with the rubber.

2. A moistureproofing coating composition comprising essentially phenol-modified rubber and wax, said phenol modified rubber being a reaction product of rubber and a phenol containing 1% to 5% of the phenol chemically combined with the rubber.

3. A method of preparing transparent moistureproof sheet wrapping material, which comprises coating a base formed of a sheet of non-fibrous and transparent cellulosic material with a composition comprising a film-forming substance and a moistureproofing wax dissolved in a solvent, said film-forming substance being phenol-modified rubber, said phenol modified rubber being a reaction product of rubber and a phenol containing 1% to 5% of the phenol chemically combined with the rubber, the proportions of the ingredients and the thickness of the coating being selected to produce a transparent moistureproof material, and evaporating the solvent at a temperature at least equal to the melting point of the wax in the composition.

4. An article of manufacture suitable for use as a sheet wrapping material, comprising a base sheet or film of transparent regenerated cellulose having a transparent, moistureproof and flexible coating on each side thereof, the total thickness of the coatings on both sides being from 0.00001 to 0.00015 of an inch, each of said coatings comprising essentially phenol-modified rubber film former, wax moistureproofing agent, blending agent and plasticizer, said phenol modified rubber being a reaction product of rubber and a phenol containing 1% to 5% of the phenol chemically combined with the rubber.

5. A sheet wrapping material comprising a water sensitive cellulosic base film and a moistureproofing coating, said moistureproofing coating comprising essentially phenol-modified rubber film former and moistureproofing wax, said phenol modified rubber being a reaction product of rubber and a phenol containing 1% to 5% of the phenol chemically combined with the rubber.

6. The product of claim 5 when the film former is beta-naphthol modified rubber, said beta naphthol modified rubber being a reaction product of rubber and beta naphthol containing 1% to 5% of beta naphthol chemically combined with the rubber.

7. The product of claim 5 when the film former is beta-naphthol modified rubber and the moistureproofing wax is paraffin having a melting point of approximately 61° C., said beta naphthol modified rubber being a reaction product of rubber and beta naphthol containing 1% to 5% of beta naphthol chemically combined with the rubber.

8. A sheet wrapping material comprising a regenerated cellulose base film and a moistureproofing coating, said moistureproofing coating comprising essentially beta-naphthol rubber film former, paraffin wax moistureproofing agent, blending agent and a plasticizer, said beta naphthol modified rubber being a reaction product of rubber and beta naphthol containing 1% to 5% of beta naphthol chemically combined with the rubber.

9. The product of claim 5 when the moistureproofing coating comprises essentially 88% beta-naphthol modified rubber and 12% paraffin wax M. P. 61° C., said beta naphthol modified rubber being a reaction product of rubber and beta naphthol containing 1% to 5% of beta naphthol chemically combined with the rubber.

10. The product of claim 5 when the moistureproofing coating comprises essentially 82% beta-naphthol modified rubber, 8% paraffin wax M. P. 61° C., and 10% hydrogenated methyl abietate, said beta naphthol modified rubber being a reaction product of rubber and beta naphthol containing 1% to 5% of beta naphthol chemically combined with the rubber.

11. Sheet wrapping material comprising a base formed of a flexible sheet of non-moistureproof, non-fibrous, regenerated cellulosic material having thereon a moistureproofing coating, said moistureproofing coating comprising essentially moistureproofing wax, film former and phenol-modified rubber, said phenol-modified rubber being a reaction product of rubber and phenol containing 1% to 5% of the phenol chemically combined with the rubber which is resinous, thermoplastic, benzene soluble, acid-resistant, alkali-resistant, which does not adhere to rubber, which has an impact strength similar to phenol aldehyde resins, and which imparts a hardness to rubber like glue.

12. Sheet wrapping material comprising a base formed of a flexible sheet of non-moistureproof, non-fibrous regenerated cellulosic material having thereon a moisture-proofing coating, said moisture-proofing coating comprising essentially paraffin wax (M. P. 61° C.) 12%, and beta-naphthol rubber 88%, said beta-naphthol rubber being the product obtainable by treating pale crepe rubber, beta-naphthol and sulfuric acid in the proportions 24:2.5:1, respectively, on a cool rubber mill, thereafter heating the mill until a strong reaction takes place, cooling and removing the uncombined beta-naphthol from the reaction product.

HAROLD STEPHENS HOLT.